(12) United States Patent
Parekh et al.

(10) Patent No.: US 8,229,433 B2
(45) Date of Patent: Jul. 24, 2012

(54) INTER-FREQUENCY HANDOFF

(75) Inventors: Nileshkumar J. Parekh, San Diego, CA (US); Fatih Ulupinar, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 11/261,804

(22) Filed: Oct. 27, 2005

(65) Prior Publication Data

US 2007/0099619 A1 May 3, 2007

(51) Int. Cl.
*H04W 36/00* (2009.01)
*H04W 4/00* (2009.01)
(52) U.S. Cl. .......................... 455/436; 455/439; 370/332
(58) Field of Classification Search .................. 455/436; 370/331
See application file for complete search history.

(56) References Cited

U.S. PATENT DOCUMENTS

| | | | |
|---|---|---|---|
| 5,260,943 A | 11/1993 | Comroe et al. | |
| 5,533,014 A * | 7/1996 | Willars et al. ................. | 370/335 |
| 5,640,679 A | 6/1997 | Lundqvist et al. | |
| 5,828,659 A | 10/1998 | Teder et al. | |
| 6,067,442 A | 5/2000 | Wiedeman et al. | |
| 6,069,880 A | 5/2000 | Owen et al. | |
| 6,072,847 A | 6/2000 | Dupuy et al. | |
| 6,097,709 A | 8/2000 | Kuwabara | |
| 6,119,005 A | 9/2000 | Smolik | |
| 6,122,270 A | 9/2000 | Whinnett et al. | |
| 6,157,845 A | 12/2000 | Henry et al. | |
| 6,181,943 B1 * | 1/2001 | Kuo et al. ..................... | 455/437 |
| 6,195,551 B1 | 2/2001 | Kim et al. | |
| 6,246,673 B1 | 6/2001 | Tiedemann, Jr. et al. | |
| 6,282,420 B1 | 8/2001 | Bamburak et al. | |
| 6,331,971 B1 | 12/2001 | Raith | |
| 6,400,952 B2 * | 6/2002 | Kim et al. ..................... | 455/436 |
| 6,465,803 B1 | 10/2002 | Bowers et al. | |
| 6,466,803 B1 | 10/2002 | Gardner | |
| 6,498,933 B1 | 12/2002 | Park et al. | |
| 6,510,146 B1 | 1/2003 | Korpela et al. | |
| 6,522,670 B1 | 2/2003 | Jokinen et al. | |
| 6,563,807 B1 | 5/2003 | Kim et al. | |

(Continued)

FOREIGN PATENT DOCUMENTS

CL 2901-2006 10/2006

(Continued)

OTHER PUBLICATIONS

Tomcik, J.: IEEE 802.20, "MBFFDD and MBTDD Wideband Mode: Technology Overview", Jan. 6, 2006, p. 1, 71-75, 105-107.

(Continued)

*Primary Examiner* — Patrick Edouard
*Assistant Examiner* — Huy C Ho
(74) *Attorney, Agent, or Firm* — Sandip S. Minhas; Darren M. Simon (57) ABSTRACT

Embodiments are described in connection with seamless inter-frequency handoff in a wireless network. Provided is a method that includes reporting to an access network sector pilot strength information for at least one frequency member in a message specified in an active set management protocol. Information regarding at least another frequency member is received in a message specified in the active set management protocol. The method further includes ascertaining whether to handoff from one frequency member to another frequency member and can further include seamlessly handing off to the other frequency member.

33 Claims, 10 Drawing Sheets

U.S. PATENT DOCUMENTS

| | | | |
|---|---|---|---|
| 6,584,318 | B2 | 6/2003 | Hakalin et al. |
| 6,603,751 | B1* | 8/2003 | Odenwalder ............... 370/331 |
| 6,608,818 | B1 | 8/2003 | Abrol et al. |
| 6,614,769 | B1 | 9/2003 | Erlick et al. |
| 6,665,281 | B1 | 12/2003 | Kim |
| 6,668,170 | B2 | 12/2003 | Costa et al. |
| 6,810,019 | B2 | 10/2004 | Steudle |
| 6,822,948 | B2 | 11/2004 | Bergstrom et al. |
| 6,829,481 | B2 | 12/2004 | Souissi |
| 6,845,238 | B1* | 1/2005 | Muller ......................... 455/436 |
| 6,891,812 | B2 | 5/2005 | Bender |
| 6,934,526 | B2 | 8/2005 | Choi et al. |
| 6,959,201 | B2 | 10/2005 | Leprieur et al. |
| 6,999,765 | B2 | 2/2006 | Hokao |
| 7,003,290 | B1* | 2/2006 | Salonaho et al. ............ 455/423 |
| 7,020,108 | B2* | 3/2006 | Virtanen ...................... 370/331 |
| 7,024,194 | B1 | 4/2006 | Oksanen |
| 7,089,004 | B2 | 8/2006 | Jeong et al. |
| 7,110,766 | B1* | 9/2006 | Tayloe et al. ................ 455/438 |
| 7,133,702 | B2 | 11/2006 | Amerga et al. |
| 7,151,756 | B1 | 12/2006 | Park et al. |
| 7,324,479 | B2 | 1/2008 | Hur |
| 7,336,951 | B2 | 2/2008 | Choi et al. |
| 7,340,251 | B1 | 3/2008 | McClure |
| 7,363,039 | B2 | 4/2008 | Laroia et al. |
| 7,367,424 | B2 | 5/2008 | Brown et al. |
| 7,379,440 | B2 | 5/2008 | Gopal |
| 7,382,750 | B2 | 6/2008 | Wu |
| 7,409,214 | B2 | 8/2008 | Lee |
| 7,415,272 | B2 | 8/2008 | Khushu et al. |
| 2002/0003784 | A1 | 1/2002 | Okabe et al. |
| 2002/0019231 | A1 | 2/2002 | Palenius et al. |
| 2002/0187804 | A1 | 12/2002 | Narasimha et al. |
| 2003/0095513 | A1 | 5/2003 | Woodmansee et al. |
| 2003/0218995 | A1 | 11/2003 | Kim et al. |
| 2003/0227946 | A1 | 12/2003 | Schwarz et al. |
| 2004/0053614 | A1* | 3/2004 | Il-Gyu et al. ................. 455/436 |
| 2004/0208140 | A1 | 10/2004 | Noguchi et al. |
| 2004/0224696 | A1 | 11/2004 | Korneluk et al. |
| 2005/0054368 | A1 | 3/2005 | Amerga |
| 2005/0058151 | A1 | 3/2005 | Yeh |
| 2005/0073977 | A1 | 4/2005 | Vanghi et al. |
| 2005/0111358 | A1 | 5/2005 | Hsu et al. |
| 2005/0122922 | A1 | 6/2005 | Wu et al. |
| 2005/0192011 | A1 | 9/2005 | Hong et al. |
| 2005/0216580 | A1 | 9/2005 | Raji et al. |
| 2005/0252262 | A1 | 11/2005 | Imai et al. |
| 2005/0272403 | A1 | 12/2005 | Ryu et al. |
| 2006/0062180 | A1 | 3/2006 | Sayeedi et al. |
| 2006/0166676 | A1 | 7/2006 | Rajkotia et al. |
| 2006/0176870 | A1 | 8/2006 | Joshi et al. |
| 2006/0223557 | A1 | 10/2006 | Manohar |
| 2007/0030830 | A1 | 2/2007 | Sagne et al. |
| 2007/0042717 | A1 | 2/2007 | Alexiou et al. |
| 2007/0097922 | A1 | 5/2007 | Parekh et al. |
| 2007/0097931 | A1 | 5/2007 | Parekh et al. |
| 2007/0099614 | A1 | 5/2007 | Parekh et al. |
| 2007/0110022 | A1 | 5/2007 | Palenius et al. |
| 2007/0218835 | A1 | 9/2007 | Hindelang et al. |
| 2008/0020769 | A1 | 1/2008 | Parekh et al. |

FOREIGN PATENT DOCUMENTS

| | | |
|---|---|---|
| CL | 2903-2006 | 10/2006 |
| CL | 2904-2006 | 10/2006 |
| CL | 2906-2006 | 10/2006 |
| CL | 2907-2006 | 10/2006 |
| CL | 2908-2006 | 10/2006 |
| CN | 1176717 | 3/1998 |
| CN | 1379963 A | 11/2002 |
| CN | 1399855 | 2/2003 |
| CN | 1400835 A | 3/2003 |
| EP | 0696147 A1 | 2/1996 |
| EP | 0 948 231 A2 | 8/1999 |
| EP | 1030477 A2 | 8/2000 |
| EP | 1117268 | 7/2001 |
| EP | 1467518 | 10/2004 |
| EP | 1467582 A1 | 10/2004 |
| JP | 6343056 A | 12/1994 |
| JP | 10512728 | 12/1998 |
| JP | 11075237 A | 3/1999 |
| JP | 2001095031 | 4/2001 |
| JP | 2002528009 T | 8/2002 |
| JP | 2003032756 A | 1/2003 |
| JP | 2003506983 | 2/2003 |
| JP | 2004504783 | 2/2004 |
| JP | 2004282557 | 10/2004 |
| JP | 2004534412 | 11/2004 |
| JP | 2004343356 A | 12/2004 |
| JP | 2005101788 | 4/2005 |
| JP | 2005260426 A | 9/2005 |
| JP | 2005260427 A | 9/2005 |
| KR | 1020010024152 | 3/2001 |
| KR | 20010102418 | 11/2001 |
| KR | 0347415 | 7/2002 |
| KR | 1020020060391 | 7/2002 |
| RU | 2180159 C2 | 2/2002 |
| RU | 2003125611 | 2/2005 |
| WO | WO 94/29981 A1 | 12/1994 |
| WO | WO9616524 A2 | 5/1996 |
| WO | WO9623369 A1 | 8/1996 |
| WO | WO9632821 | 10/1996 |
| WO | WO9923844 | 5/1999 |
| WO | WO 99/43178 A1 | 8/1999 |
| WO | 0022837 | 4/2000 |
| WO | WO0041429 A1 | 7/2000 |
| WO | WO0111914 | 2/2001 |
| WO | WO 01/20942 A1 | 3/2001 |
| WO | 0239758 | 5/2002 |
| WO | WO03017596 A2 | 2/2003 |
| WO | 2004091231 | 10/2004 |

OTHER PUBLICATIONS

Tomcik, J. "MBFDD and MBTDD Wideband Mode: Technology Overview," (Oct. 2005) pp. 1-109.

Turner, S. et al.: "CDMA2000 Hybrid Access Terminal Operation White Paper," (Apr. 2001) pp. 1-25.

3GPP TR 25.922 v.6.0.1: 3rd Generation Partnership Project; Technical Specification Group Radio Access Network; Radio resource management strategies (Release 6) (Apr. 2004) pp. 15-31.

International Search Report—PCT/US06/060331—International Search Authority, European Patent Office—Apr. 16, 2007.

Written Opinion—PCT/US06/060331—International Search Authority, European Patent Office—Apr. 16, 2007.

International Preliminary Report on Patentability—PCT/US06/060331—The International Bureau of WIPO, Geneva, Switzerland—Apr. 29, 2008.

Taiwanese Search report—095139664—TIPO—Jun. 15, 2010.

Translation of Office Action in Chinese application 200680039865.2 corresponding to U.S. Appl. No. 11/261,824, citing CN1400835, WO2004091231, CN1379963 and CN1176717 dated Jan. 26, 2011.

Translation of Office Action in Chinese application 200680049135.0 corresponding to U.S. Appl. No. 11/261,804, citing CN1399855 dated Apr. 6, 2011.

Translation of Office Action in Japanese application 2008-538005 corresponding to U.S. Appl. No. 11/261,824, citing JP2003032756, JP2005101788, WO0111914, JP2003506983, JP2004343356, JP1175237, WO0022837, JP2002528009, WO9623369 and JP10512728 dated Nov. 30, 2010.

Translation of Office Action in Korean application 2008-7012741 corresponding to U.S. Appl. No. 11/261,824, citing KR1020010024152, KR20010102418 and US20030003951 dated Feb. 28, 2011.

UMTS; Radio Resource Management Strategies, ETSI TR 25.922 V3.6.0 (Sep. 2001).

* cited by examiner

INTER-FREQUENCY HANDOFF

BACKGROUND

I. Field

The following description relates generally to wireless communications, and, amongst other things, to seamless inter-frequency handoff in wireless communication networks.

II. Background

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs) and the like, and demand reliable service and expanded coverage areas.

To effectuate continued coverage for mobile stations, access points (base stations, access networks, etc.) associated with cellular networks are geographically positioned so as users change location they do not lose services. Thus, mobile stations can be "handed off" from a first base station to a second base station. In other words, a mobile station will be serviced by a first base station while in a geographic region associated with such base station. When the mobile station is transported to a region associated with a second base station, the mobile station will be handed off from the first base station to the second base station. Ideally, the handoff occurs without data loss, loss of service, and the like.

Conventionally, this handoff occurred through a significant amount of messaging between mobile stations and base stations. For instance, as a mobile station was transported toward a base station, various messages were delivered between the mobile station and the base station, as well as between the base station and a base station currently servicing the mobile station. This messaging enables assignment of forward link and reverse link channels to be made between the mobile station and the base stations. To enable a handoff to occur quickly and without loss of a substantial amount of data, a set of base stations can be prepared to provide services to the mobile station.

This set of base stations can be updated as the geographic region associated with the mobile station is altered. In more detail, the mobile station can be adapted to monitor for communications or receive communications over a first frequency from a first base station. A second base station can communicate with the mobile station over the same frequency, and the second base station can be added to the set of base stations if particular performance parameters are met. Once the base station is added to the set, it is prepared to service the mobile station once it enters a particular geographic range of such base station. The handoff between base stations occurs expediently as well as without loss of any significant amount of data.

Transferring or handing off to another sector operating at the same frequency is common and can be performed utilizing existing techniques. However, handing off frequencies between sectors, or inter-frequency is typically achieved using a hard handoff in which probability of loss of data and loss of connection is higher. Inter-frequency handoff includes handing off between systems of the same technology but over different frequencies. A network deployment needs inter-frequency handoff for various business reasons, such as availability of spectrum and frequency reuse factor. In such a deployment, there is a need for a seamless inter-frequency handoff. Therefore, to address the aforementioned, there is a need for techniques to facilitate seamless inter-frequency handoffs to improve communication and efficiency in wireless network systems.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with seamless inter-frequency handoff in a wireless network. According to an embodiment, a method includes reporting to an access network a sector pilot strength information for at least one frequency member in a message specified in an active set management protocol. Information regarding at least another frequency member is received in a message specified in the active set management protocol. The method further includes ascertaining whether to handoff from one frequency member to another frequency member. Both frequency members are included in an active set. The method can also include seamlessly handing off to the other frequency member.

According to another embodiment is wireless communication device that includes a processor and a memory coupled with the processor. The processor can be configured to select a frequency member to handoff a user device based in part on a radio channel condition with the current service sector and the strength of the Pilot for other frequency sectors. In other embodiments, the processor can be coupled with a frequency optimizer that optimizes a communication based on a determination of when to facilitate an inter-frequency handoff.

According to yet another embodiment is an apparatus for seamless inter-frequency handoff in a wireless communication environment. The apparatus can include means for providing location information of a mobile device and means for reporting a channel quality indicator to at least one sector. Also included can be means for reporting other frequency sector pilot strengths in a PilotReport message and means for seamlessly performing an inter-frequency handoff, between at least two sectors included in an active set.

According to another embodiment is a computer-readable medium having stored thereon computer-executable instructions. The instructions can include receiving a SystemParameter message from a first access network having a first frequency pilot and calculating a time for measuring a second frequency pilot of a second access network. The instructions can further include sending an AttributeUpdateRequest message, receiving an AttributeUpdateAccept message. A tuneaway is enabled and a determination is made whether to initiate a measurement of the second frequency pilot. Further, the instructions can include measuring the second frequency pilot and sending a PilotReport message for the second frequency pilot.

According to a further embodiment is a processor that executes instructions for seamless inter-frequency hand off in a wireless communication environment. The instructions can include reporting a channel quality indicator to at least one sector. The instructions can include reporting a channel quality indicator to at least one sector and reporting other frequency sector pilot strength in a PilotReport message. The instructions can further provide seamlessly performing an inter-frequency handoff.

According to another embodiment is a method for seamless inter-frequency handoff. The method includes receiving a request for a tune-away period from an access terminal and sending a permission message to the access terminal to tune-away. The method further includes receiving from an access terminal a sector pilot strength information for at least one frequency member in a message specified in an active set management protocol; and sending information about at least another frequency member in a message specified in the active set management protocol. Further including in the method is allowing the access terminal to seamlessly handing off to the at least another frequency member.

According to a further embodiment is an access network that provides inter-frequency handoff in a wireless communication system. The network includes a receiver that receives a tune-away request from a mobile device and a transmitter that sends an ActiveSetAssignment message that notifies the mobile device that at least two access networks are included in an active set. The transmitter can transmitter can further request at least a second access network to respond with resources the second access network has available for the mobile device. The receiver can further receive resource information from at least a second access network.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing these embodiments.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Figure 1:
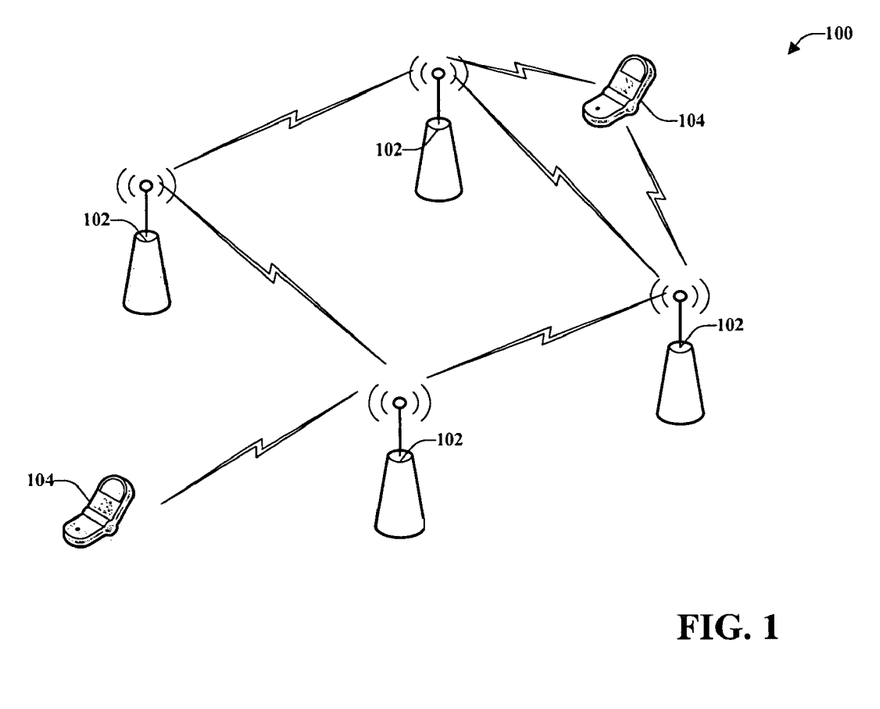
FIG. 1 illustrates a wireless communication system 100 in accordance with various embodiments presented herein.

Referring now to the drawings, FIG. 1 illustrates a wireless communication system 100 in accordance with various embodiments presented herein. System 100 can comprise one or more access point(s) or base stations 102 that receive, transmit, repeat, etc., wireless communication signals to each other and/or to one or more mobile devices 104. Access point(s) 102 can represent an interface between wireless system 100 and a wired network (not shown).

Each access point 102 can comprise a transmitter chain and a receiver chain, each of which can in turn comprise a plurality of components associated with signal transmission and reception (e.g., processors, modulators, multiplexers, demodulators, demultiplexers, antennas, . . . ). Mobile devices 104 can be, for example, cellular phones, smart phones, laptops, handheld communication devices, handheld computing devices, satellite radios, global positioning systems, PDAs, and/or other suitable devices for communicating over wireless system 100. In wireless system 100, the periodic transmission of small data packets (commonly referred to as beacons) from access point 102 can make known the presence of wireless system 100 and transmit system 100 information. Mobile devices 104 can sense the beacons and attempt to establish a wireless connection to access points 102 and/or to other mobile devices 104.

System 100 facilitates seamless transition through various networks and/or protocols that operate in different sectors and/or on different frequencies to provide a user using mobile device 104 the ability to take advantage of the available networks and protocols. System 100 also automatically affords the user the opportunity to utilize the best access point or sector either internal or external to the network that operate on the same or a different frequency given the current location of the user, and/or a reported sector pilot strength. The user can take advantage of the various sectors regardless if mobile device 104 is in idle mode (idle session) or connected mode (active session).

Idle mode refers to the time(s) when there is no user service but the mobile device 104 is monitoring paging channels and t overhead channels. During idle mode, the receiver (mobile device) is available for downlink measurements. There can also be unscheduled reselection of new access networks and/or new technology during idle mode. Prior to entering idle mode (e.g., at power up) mobile device 104 should perform System Selection to determine the best or optimal system available for service. While in idle mode, mobile device should continuously examine neighbor access networks. Upon determination of a "better" access network, mobile device 104 can transition over the new access network. Connected mode refers to active user service (e.g., a call, active data connection). During this mode, it can be possible to handoff the device to new technologies and/or frequencies. There may be limited receiver availability for measurements during this time because the user service takes priority.

A component in the mobile device 104 can monitor and/or detect one or more channel conditions operating on one or more frequencies. Provided a channel condition remains at or above a predetermined threshold or channel quality the mobile device 104 does not switch channels. However, if the channel quality (e.g., signal to noise ratio) falls below the predetermined threshold level, there is a switch off to a different channel.

In some embodiments, a component located in mobile device 104 can operate in conjunction with one or more access point 102 to facilitate ascertaining a location of mobile device 104 in each network and can be facilitated though various location techniques. The location information can be utilized to predict which user is best suited to have a transparent handoff to a secondary network that is operating on the same or a different frequency than that currently utilized by mobile device 104. For example, a user can be quickly moving through a city in a car, for example. Various access points with which the mobile device 104 could communicate can operate on different frequencies. Mobile device 104 can seamlessly switch from one frequency to another, etc. as the user approaches a specific access point. The network to which the mobile device is switched can be a function of the location of the user and/or detected frequency strength. The handoff can be an intra-frequency handoff and/or an inter-frequency handoff. However, it is to be understood that utilizing the location of the mobile device 104 to determine a handoff is optional and does not have to be utilized in accordance with various techniques disclosed herein.

Figure 2:
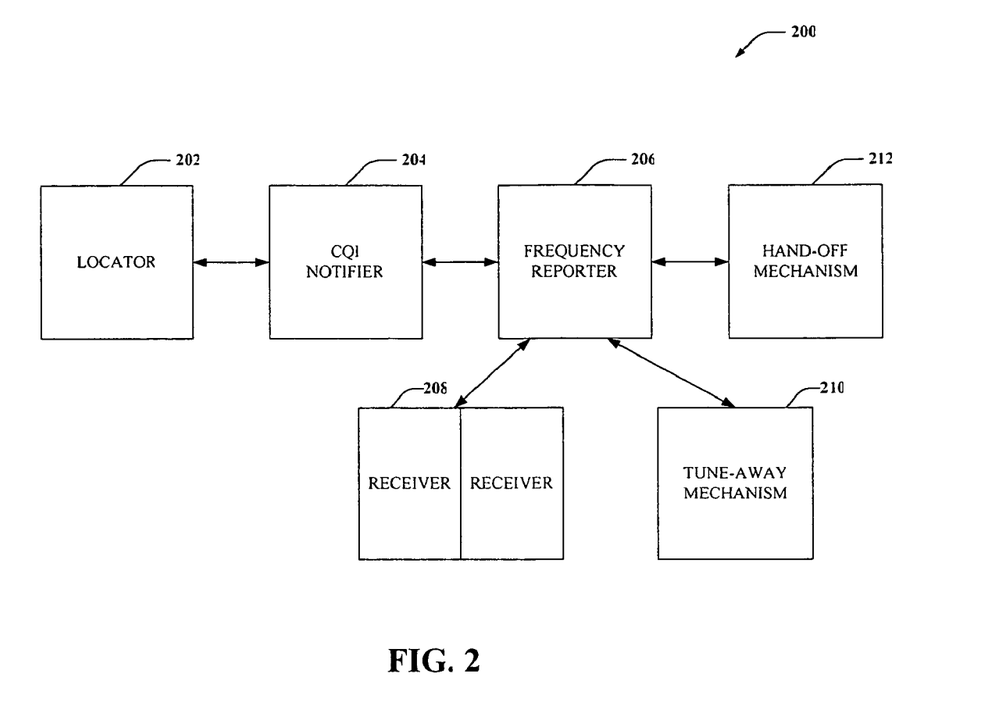
FIG. 2 illustrates functional blocks utilized with various embodiments presented herein.

FIG. 2 illustrates functional blocks utilized with various embodiments presented herein. These functional blocks represent functions implemented by a processor, software or combination thereof (e.g., firmware). Illustrated are a locator 202, a channel quality indicator (CQI) notifier 204, a frequency reporter 106 and a handoff mechanism 208. It should be understood that more or less functional blocks could be utilized with the disclosed embodiments. For example, two or more functional blocks can be combined or a functional block can be separated into two or more functional blocks. A combination of these approaches may also be used.

An optional locator 202 can be configured to provide information regarding the location of a mobile device. Location information can be provided by, for example, Global Positioning System (GPS) or other location determination mechanisms, such as a default active set management protocol. The active set management protocol can provide procedures and messages that are utilized by an access terminal and an access point to monitor or track the access terminal's approximate location.

The Active Set can also be utilized to maintain a radio link as the access terminal moves between the coverage areas of different sectors. Active set is defined as a set of pilots of sectors with allocated MACID for an access terminal. Active set is a set of sectors that has knowledge about a mobile device and locates certain resources to provide its service. Active set members can be synchronous or asynchronous with respect to each other. The access terminal can switch its serving sector at any time among these active set member sectors. A synchronous subset of an active set consists of sectors that are synchronous with each other. Moreover, the subset is a maximal subset, e.g., all sectors that are synchronous with the sectors in this subset are contained in the subset. The different synchronous subsets $AS_{SYNCH}$ can be construed using the last instance of an ActiveSetAssignment message. Transmission from the access terminal to two different synchronous subsets of the active set is independent from each other. For example, CQI notifier 204 can be configured to notify or report a CQI to a synchronous subset of sectors independent of any other synchronous subsets.

In order to facilitate seamless inter-frequency handoff, the active set concept is extended to include members from two or more frequencies. Thus, the active set can include members from these two or more frequencies, thereby, minimizing the amount of time necessary to handoff between these two or more frequencies. The sector from the different frequencies may be synchronous or asynchronous with respect to each other. To facilitate adding another frequency sector into the active set, frequency reporter 206 can be configured to report other frequency sector pilot strength in a message specified in the active set management protocol. Frequency reporter 206 can further be configured to measure the other frequency sector pilot strength.

There are various ways that pilot strength can be reported. While in idle mode, a receiver is available for frequency measurements (assuming slotted operation in idle mode). To report the pilot strength in connected mode, either dual receivers 208 or a temporary tune-away mechanism 210 is utilized. Tune-away is a mechanism to measure other system frequencies by taking time away from a service. In some embodiments, two or more receiving means are available. One receiving means can be utilized to continue or establish a communication on a radio link while the other receiving means performs various functions to establish and perform the inter-frequency handoff. Yet, in other embodiments, dual receivers are not available, thus tune-away mechanism 208 is provided which will be discussed below with reference to FIGS. 3 and 4.

Inter-frequency handoff mechanism 212 can be configured to facilitate seamless handoffs that do not interrupt a radio link. Various parameters can be monitored to ensure that a particular handoff will not disrupt a radio link. These parameters can include but are not limited to the location of a user device and/or the location of one or more access networks to which the mobile device may handoff. If it is anticipated that a particular handoff will disrupt the radio link, the inter-frequency handoff should not be allowed, thus maintaining system 200 integrity.

In the following detailed description, various aspects and embodiments may be described in the context of time division duplexing (TDD) systems or frequency division duplexing (FDD) systems. While these inventive aspects may be well suited for use with the disclosed embodiments, those skilled in the art will readily appreciate that these inventive aspects are likewise applicable for use in various other systems. Accordingly, any reference to TDD and/or FDD is intended only to illustrate the inventive aspects, with the understanding that such inventive aspects have a wide range of applications.

Figure 3:
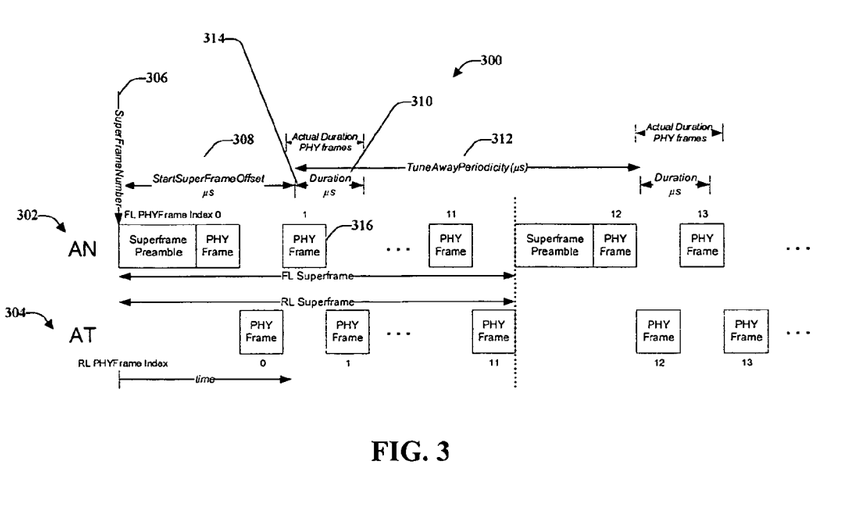
FIG. 3 illustrates tune-away timing or scheduling in a time division duplexing (TDD) system according to various embodiments.

FIG. 3 illustrates tune-away timing or scheduling 300 in a time division duplexing (TDD) system according to various embodiments. Tune-away mechanism 208 (as illustrated in FIG. 2) includes a tune-away schedule and a tune-away control. The TuneAwayScheduleN attribute provides a means to communicate tune away schedule(s) between an access terminal and an access point. The timing for an access network 302 is illustrated at the top of the figure and the timing for the access terminal 304 is illustrated at the bottom. Access network 302 includes a plurality of forward-link PHY frames of which frames 0, 1, . . . 11, 12 and 13 are illustrated. Likewise, access terminal includes a plurality of reverse-link PHY frames of which frames 0, 1 . . . 11, 12, and 13 are illustrated. It should be understood that this timing is continuous and can be indefinite in nature.

Schedule 300, assumes that the first tune-away occurred during the SuperFrame defined by SuperFrameNumber, illustrated as 306, provided in the TuneAwayScheduleN. Furthermore, more refined time of first tune-away is StartSuperFrameOffset 308, which is defined in microseconds (μs) from the beginning of the SuperFrame identified before. The TuneAwayDuration 310 is the length, in microseconds, that the access terminal 304 tunes away. The TuneAwayPeriodicity 312 determines the time between the start of successive tune away in units of microseconds. Access terminal 304 can negotiate one or more tune away schedules. It is to be understood that more than one schedule may be need to monitor pages of one system, for example, and to tune-away for inter-frequency handoff.

If a tune-away period causes the access terminal 304 to miss the SystemInfo block, the access terminal should maintain tune-away for the entire validity period of the SystemInfo block. The validity period is about two Superframes. If tune-away begins at some point other than the beginning of the particular frame (e.g., close to the beginning, middle, near the end, or any place there between), as indicated at 314, both the access network and the access terminal interpret this as beginning at the beginning of PHY frame, such as the beginning of frame 316, for example. In a similar manner, if tune-away ends at any point within the frame, the tune-away ends at the end of that frame. It should be noted that each sector can have a notion of Mobile Broadband Wireless Access (MBWA) time beginning with a first transmitted Superframe. Based upon this notion, a schedule can be created by the access terminal and a frame boundary that occurs just prior to the tune-away can be location (e.g., a position in time that corresponds to the frame boundary.

Figure 4:
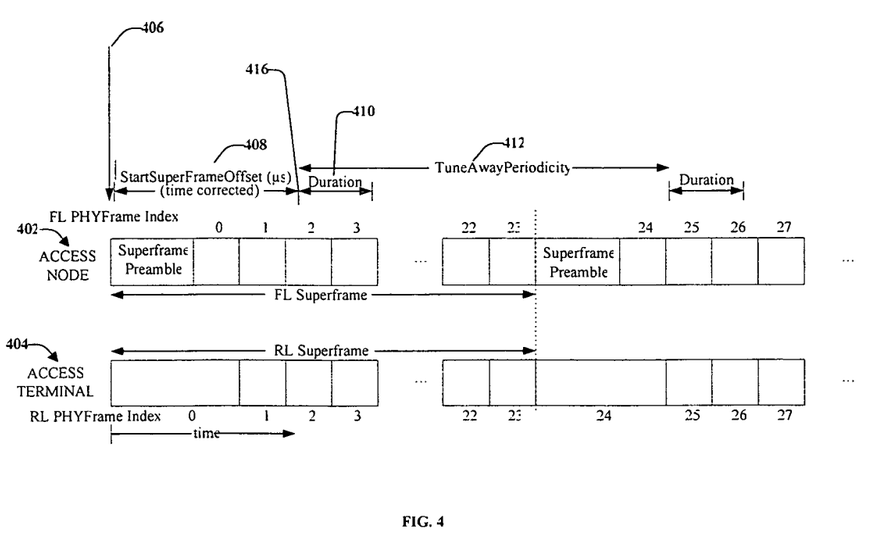
FIG. 4 illustrates tune-away timing or scheduling in a frequency division duplexing (FDD) system according to various embodiments.

FIG. 4 illustrates tune-away timing or scheduling 400 in a frequency division duplexing (FDD) system according to various embodiments. The schedule for an access network 402 is depicted at the top of the figure and the schedule for the access terminal 404 is depicted at the bottom of the figure. Access network 402 includes a plurality of forward-link PHY frames of which frames 0, 1, 2, 3 . . . 22, 23, 24, 25, 26, and 27 are illustrated. Likewise access terminal includes a plurality of reverse-link PHY frames of which frames 0, 1, 2, 3 . . . 22, 23, 24, 25, 26, and 27 are illustrated. It should be understood that this timing is continuous and can be indefinite in nature.

A StartSuperFrameNumber 406 is utilized to compute the tune-away cycles. A basic assumption is made that the first tune-away occurred during the StartSuperFrameNumber 406. A StartSuperFrameOffset field 408 is measured in units of microseconds. To compute the tune-away cycles, it should be assumed that the first tune-away begins at the StartSuperFrameOffset 408 time, after the beginning of Superframe number StartSuperFrameNumber 406.

The duration of a tune-away in units of microseconds is determined by field TuneAwayDuration 410. To determine the time between the start of successive tune-aways in units of microseconds, a TuneAwayPeriodicity field 412 is utilized. If a duration falls in a forward-link physical frame 0, both access network 402 and access terminal 404 will expire reverse-link assignment earlier. As illustrated, reverse-link PHY frame 0 should start earlier than forward-link PHY frame 0.

Methodologies relating to inter-frequency handoff are illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 5:
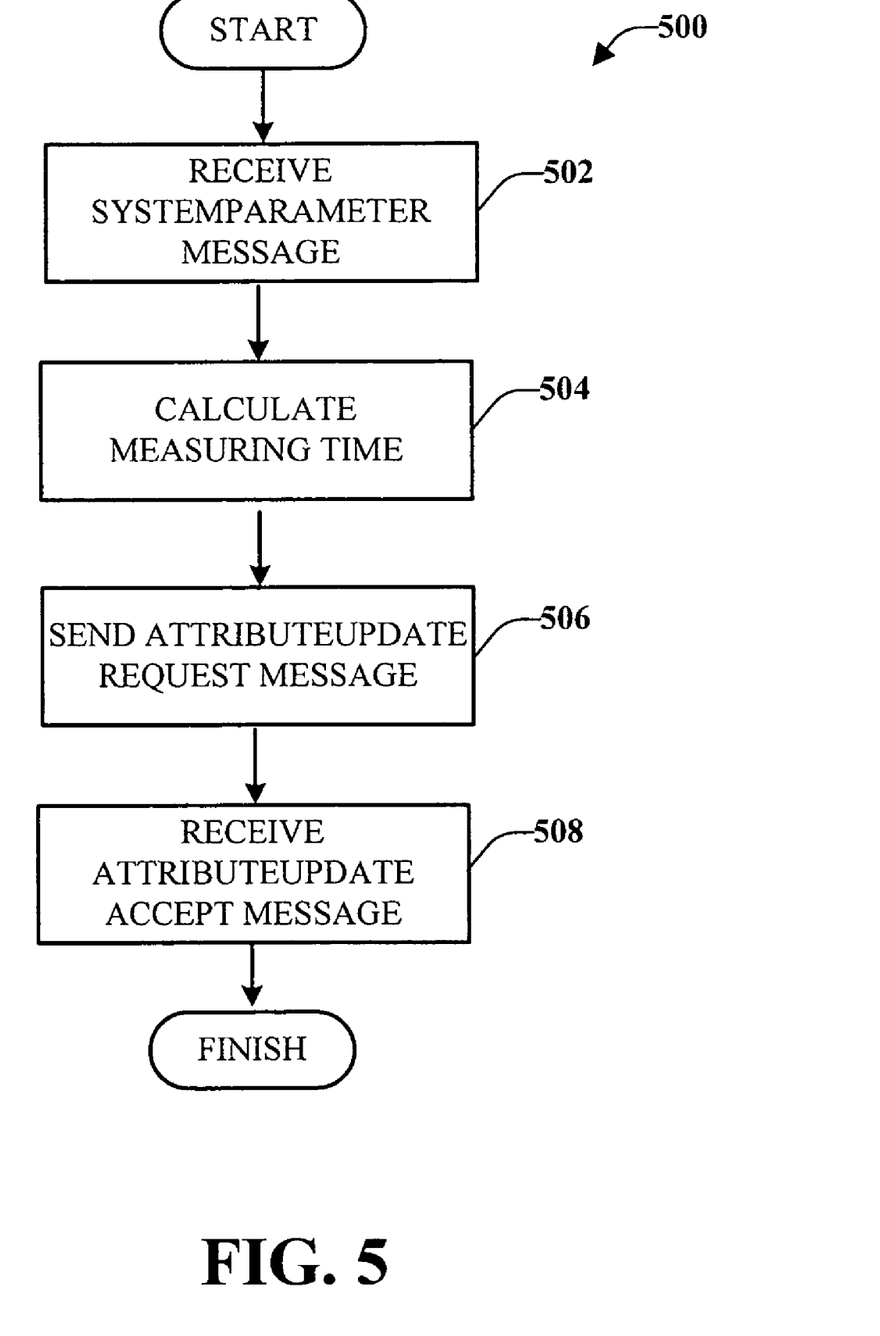
FIG. 5 illustrates a methodology for determining an inter-frequency handoff to an access network according to various embodiments.

FIG. 5 illustrates a methodology 500 for communicating an inter-frequency handoff message. The method 500 begins, at 502, where a SystemParameter message is received from a first access network having a first frequency pilot. The SystemParameter can include a frequency neighbor list for access networks in the same or other wireless systems. At 504, the time for measuring a frequency pilot for the other access network(s), which could have a different frequency than the first access network, is calculated. This calculated time can be utilized to control a tune-away period, if needed. An AttributeUpdateRequest message is sent, at 506, which is a tune-away attribute. If this request is accepted, an AttributeUpdateAccept is received, at 508 and tune-away is enabled.

The tune-away can include discontinuing monitoring forward link control channels associated with an access point and/or discontinuing communications to an access point over a reverse-link. In some embodiments, reporting the sector pilot strength information utilizes dual-receiver functionality. One receiver can be used for communication purposes and a second receiver can be used to measure the sector pilot strength.

Figure 6:
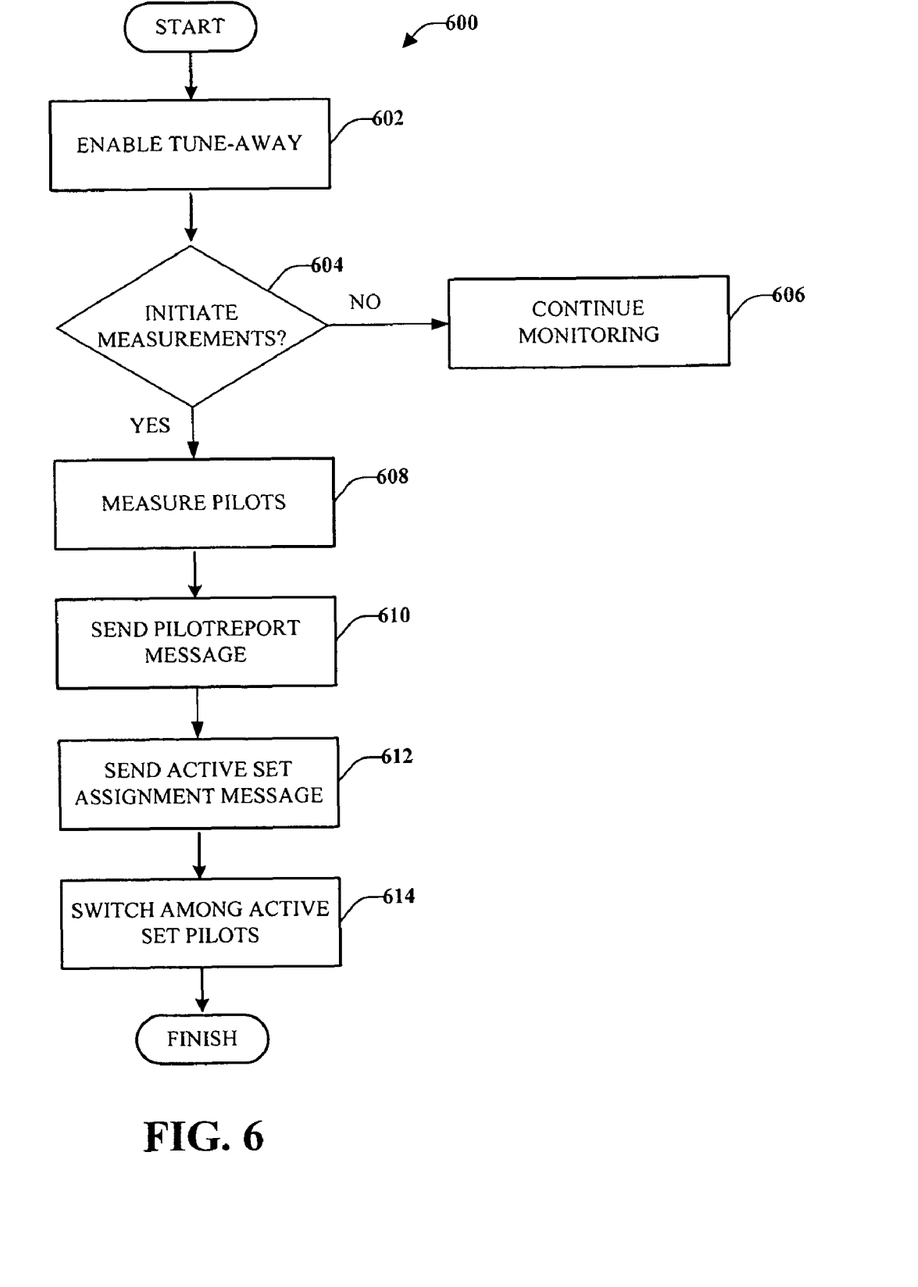
FIG. 6 illustrates a methodology for performing an inter-frequency handoff in a wireless communication environment according to various embodiments presented herein.

FIG. 6 illustrates a methodology 600 for determining an inter-frequency handoff according to various embodiments. Method 600 begins at 602 when an access terminal enables a tune-away period by utilizing, for example, the method described with reference to FIG. 5. Tune-away is enabled by a request by access terminal to the access point. Provided the access point responds with an acceptance, the access terminal can tune-away.

The method continues, at 604, where a determination is made whether to initiate the measurements. If the determination, at 604, is "no," the method 600 continues at 606 where monitoring of potential access networks to which to handoff to is continuously or periodically performed. If the determination at 604 is "yes," the method 600 continues at 608. The mobile device tunes to at least a second access network having the same or a different frequency and a measurement is taken of the pilots in the neighbor list for the second access network, during tune-away. After taking the measurement, the mobile device can re-tune to the first access network and, at 610, a PilotReport message can be sent to the first access network. Sending the PilotReport message happens optionally if the threshold is reached for a measured pilot.

The method continues at 612 where an active set assignment message is sent. This message can be sent if the access network decides the pilot need to be added and/or removed from the active set. Once the pilot is in active set, the access terminal can switch among any active set pilots, at 614. Handoff can now take place and the access terminal can switch between pilots provided the pilot is a member of the active set. The access terminal might handoff if the pilot strength of current serving sector falls below a certain threshold and/or pilot strength of other frequency sector goes above a certain threshold. Various mechanisms can be utilized to report the pilot strength information. For example, the mobile device can have dual receivers (or more than two receivers). One receiver can be utilized to continue communicating information over a radio link while the other receiver is utilized to report the pilot strength information.

In other embodiments, a mobile device may only have one receiver and a tune-away protocol is utilized. The tune-away protocol provides that the mobile device does not send or receive communication during a specific time having a predetermined length. During this tune-away period, the receiver can measure the pilot strength information and then return to a communication mode without interruption of such communication or radio link. This temporary tuning-away can be performed at substantially the same time as the mobile device is in a connected or active mode.

Figure 7:
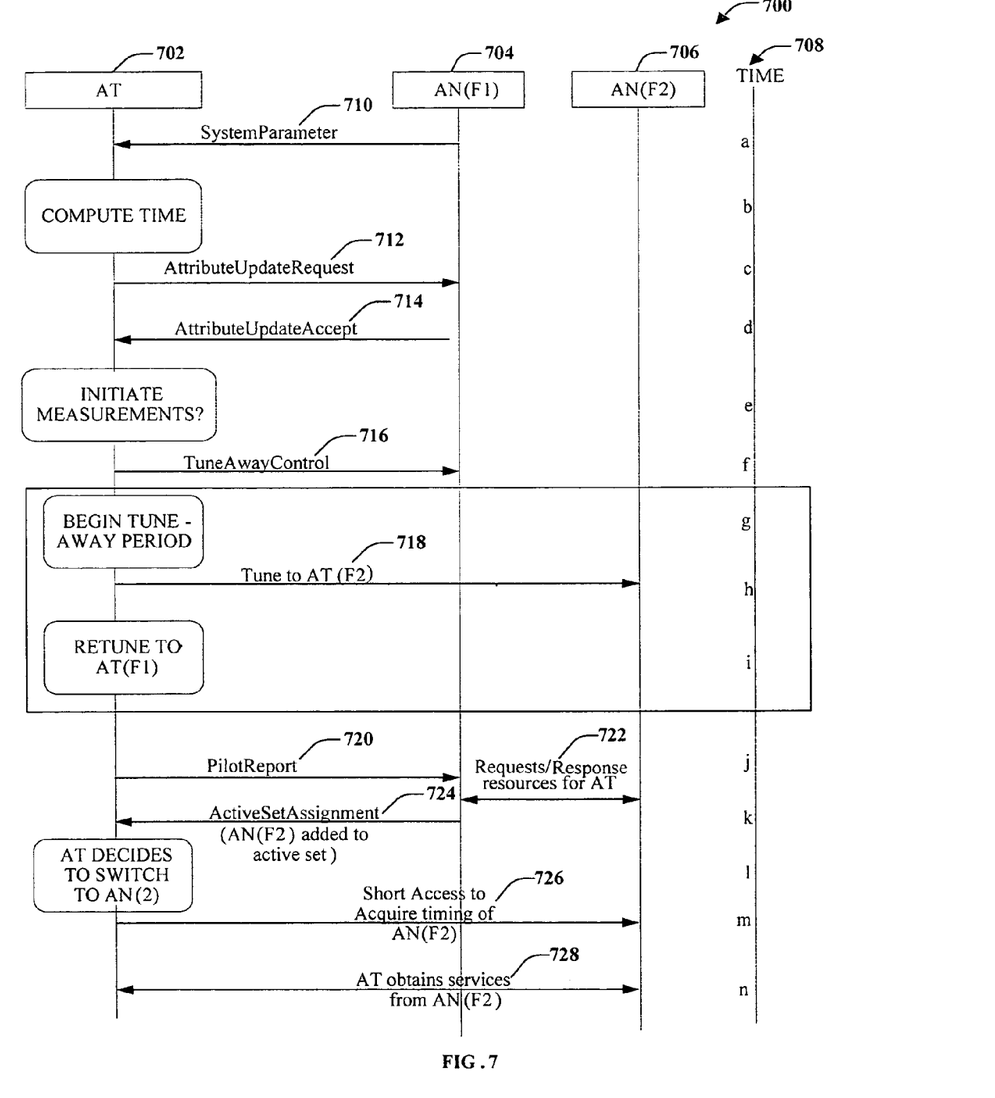
FIG. 7 illustrates a graphical representation of an inter-frequency handoff message.

FIG. 7 illustrates a graphical representation 700 of an inter-frequency handoff message. Illustrated is the message flow between an access terminal (AT) 702, an access network having a first frequency (AN(F1)) 704, an access network having a second frequency (AN(F2)) 706. The time line is shown at 708 and is illustrated from time "a" through time "n."

During time "a," a SystemParameter message 710 is sent from AN(F1) 704 to access terminal 702. SystemParameter message 710 can include other frequency neighbor list. At time "b," access terminal 702 calculates the time necessary for measuring the other frequency pilot. Access terminal 702 sends to AN(F1) 704 an AttributeUpdate Request 712 that can include a TuneAway Attribute, during time "c". Provided the AttributeUpdateRequest is accepted, during time "d" an AttributeUpdateAccept message 714 is transmitted. Access terminal 702 decides whether to initiate measurements during time period "e." If the measurements are to be initiated, during time "f," a TuneAwayRequest message 716 is transmitted to AN(F1) 704. AN(F1) 704 sends a TuneAwayResponse message to access terminal 702.

The beginning of the next tune-away period occurs at time "g." At this time, the forward-link/reverse-link assignments expire. During the next time period "h", access terminal 702 tunes to AN(F2), at 718, and measures its pilots. During the next time period "i" access terminal 702 re-tunes to AN(F1) 704 and resumes use of serving sector. If the measured Pilots cross a threshold, a PilotReport message 720 is sent during time "j" that may include other frequency pilots. At 722, AN(F1) 704 and AN(F2) communicate to request and/or respond regarding resources available for access terminal 702. If access network decides to add the other frequency sector AN(F2) 706 to the active set based on pilot report, it then sends in step, "k," active set assignment message 724 to the access terminal 702 that includes the pilot for AN(F2) 706. AN(F2) 706 is added to active set. At this point the access network of AN(F2) 706 is part of the active set for access terminal 702. Initially, at time "a," AN(FL) 704 was the only network included in the active set, thus after time "k" there are now two access networks on the active set. Access terminal 702 can now switch between AN(F1) 704 and AN(F2) 706, and any other networks included in the active set. Access terminal might decide to switch based on a pilot measure or other measurements that indicate a different network would provide optimal channel conditions.

With AN(F2) 706 is in the active set, access terminal 702 may decide to perform an inter-frequency handoff to AN(F2) 706. If access terminal 702 decides to perform the handoff, at 726, it contacts AN(F2) 706 with a short access to acquire timing information of AN(F2) 706. This occurs during time "m." During time "n" access terminal 702 and AN(F2) 706 communicate and access terminal 702 receives services from AN(F2) 706, until another inter-frequency handoff occurs with an access network included in the active set. Other access networks are added to the active set and mobile device 702 can handoff to those networks in a substantially similar manner as that described above.

Figure 8:
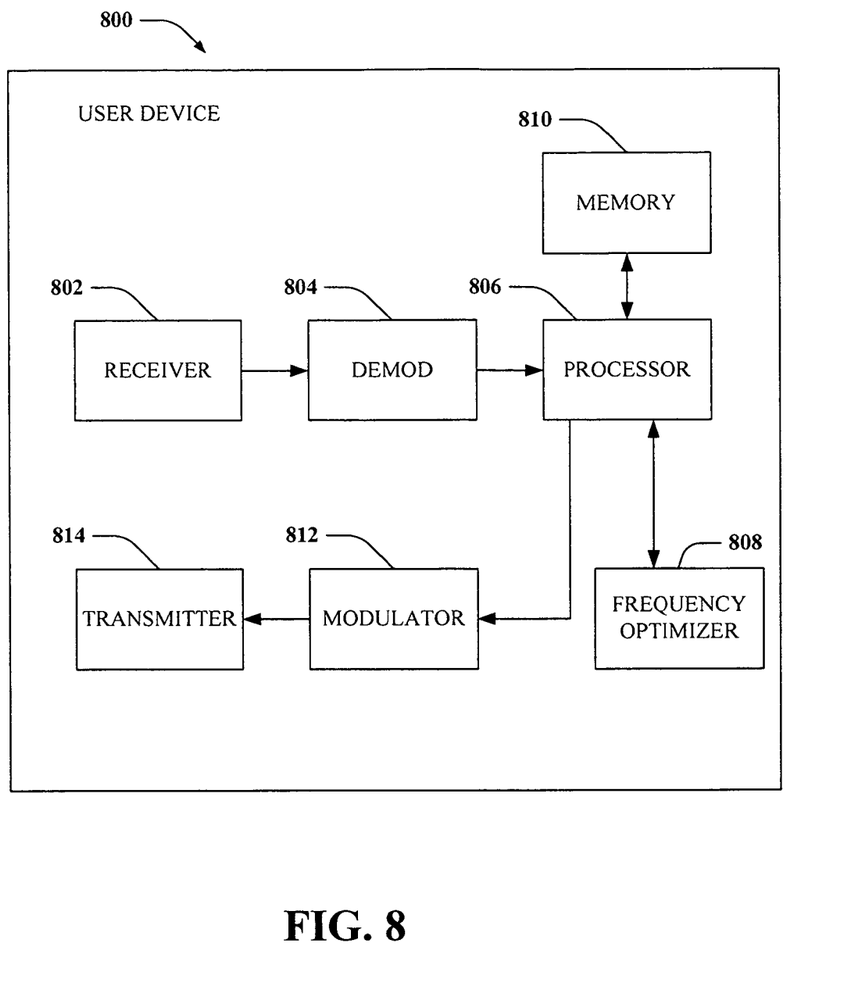
FIG. 8 illustrates a system that utilizes inter-frequency handoff in a wireless communication environment in accordance with the one or more embodiments presented herein.

FIG. 8 illustrates a system 800 that utilizes inter-frequency handoff in a wireless communication environment in accordance with the one or more embodiments presented herein. System 800 can reside in a base station and/or in a user device, as will be appreciated by one skilled in the art. System 800 includes a receiver 802 that receives a signal from, for instance one or more receive antennas, and performs typical actions thereon (e.g., filters, amplifies, downconverts, . . . ) the received signal and digitizes the conditioned signal to obtain samples. A demodulator 804 can demodulate and provide received pilot symbols to a processor 806 for channel estimation.

Processor 806 can be a processor dedicated to analyzing information received by receiver 802 and/or generating information for transmission by a transmitter 814. Processor 806 can be a processor that controls one or more components of user device 800, and/or a processor that analyzes information received by receiver 802, generates information for transmission by a transmitter 814, and controls one or more components of user device 800. User device 800 can include a frequency optimizer 808 that coordinates inter-frequency handoff and assignments. Frequency optimizer 808 may be incorporated into the processor 806. It is to be appreciated that frequency optimizer 808 can include optimization code that performs utility based analysis in connection with assigning user devices to different frequency sectors. The optimization code can utilize artificial intelligence based methods in connection with performing inference and/or probabilistic determinations and/or statistical-based determinations in connection with optimizing user device inter-frequency handoffs.

User device 800 can additionally comprise memory 810 that is operatively coupled to processor 806 and that stores information related to frequency and/or sector pilot strength information, lookup tables comprising information related thereto, and other suitable information related to inter-frequency handoff as described herein. Memory 810 can additionally store protocols associated with generating lookup tables, etc., such that user device 800 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and other suitable types of memory. The processor 806 is connected to a symbol modulator 812 and transmitter 814 that transmits the modulated signal.

Figure 9:
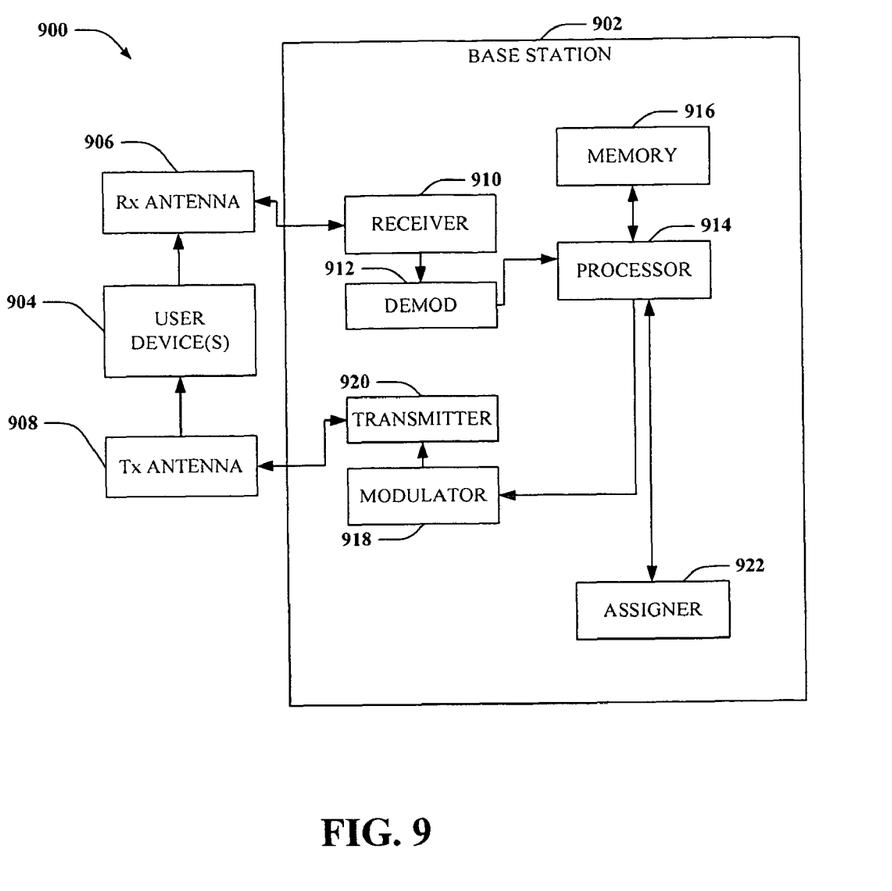
FIG. 9 illustrates a system that utilizes inter-frequency handoff techniques to increase system capacity in a wireless communication environment in accordance with the various embodiments.

FIG. 9 illustrates a system that utilizes inter-frequency handoff techniques to increase system capacity in a wireless communication environment in accordance with the various embodiments. System 900 comprises a base station 902 with a receiver 910 that receives signal(s) from one or more user devices 904 through one or more receive antennas 906, and transmits to the one or more user devices 904 through a plurality of transmit antennas 908. In one or more embodiments, receive antennas 906 and transmit antennas 908 can be implemented using a single set of antennas. Receiver 910 can receive information from receive antennas 906 and is operatively associated with a demodulator 912 that demodulates received information. Receiver 910 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 914 that is similar to the processor described above with regard to FIG. 8, and is coupled to a memory 916 that stores information related to user device assignments, lookup tables related thereto and the like. Receiver output for each antenna can be jointly processed by receiver 910 and/or processor 914. A modulator 918 can multiplex the signal for transmission by a transmitter 920 through transmit antennas 908 to user devices 904.

Base station 902 further comprises an assigner 922, which can be a processor distinct from or integral to processor 914, and which can evaluate a pool of all user devices in a sector served by base station 904 and can assign user devices to particular frequency sectors based at least in part upon the location of the individual user devices, frequency transfer scheme, or the like.

Figure 10:
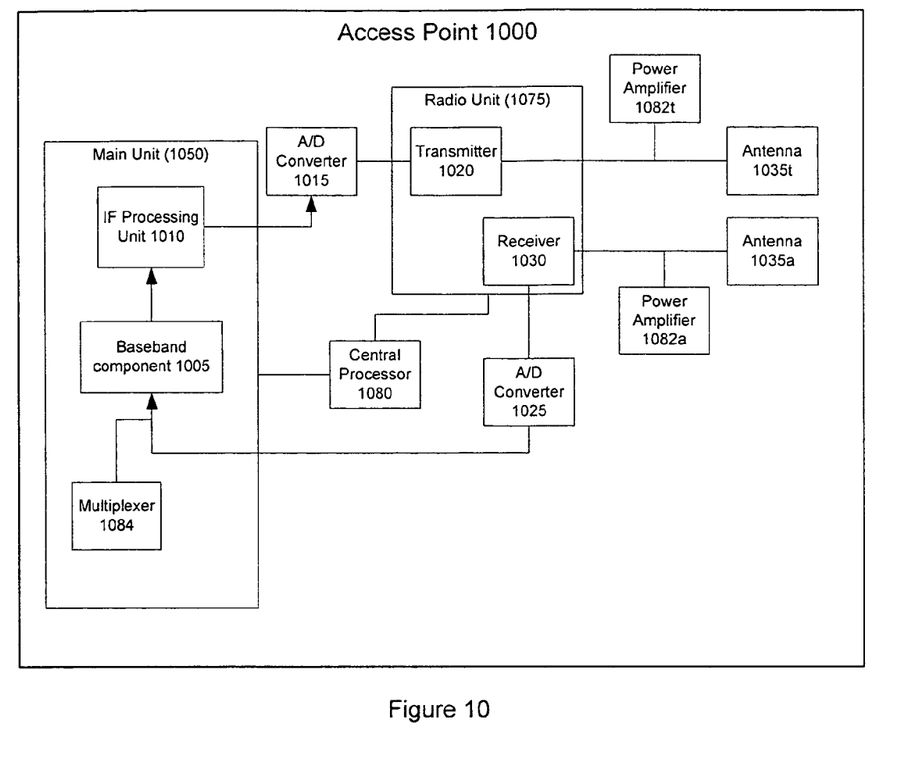
FIG. 10 is an illustration of an access point system.

As shown in FIG. 10, a radio access point can comprise a main unit (MU) 1050 and a radio unit (RU) 1075. MU 1050 includes the digital baseband components of an access point. For example, MU 1050 can include a baseband component 1005 and a digital intermediate frequency (IF) processing unit 1100. Digital IF processing unit 1000 digitally processes radio channel data at an intermediate frequency by performing such functions as filtering, channelizing, modulation, and so forth. RU 1075 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1075 can include one or more receivers 1030 connected to one more antennas 1035a-t for receiving radio communications from mobile subscriber units. In an aspect, one or more power amplifiers 1082a-t are coupled to one or more antennas 1035a-t. Connected to receiver 1030 is an analog-to-digital (A/D) converter 1025. A/D converter 1025 converts the analog radio communications received by receiver 1030 into digital input for transmission to baseband component 1005 via digital IF processing unit 1010. RU 1075 can also include one or more transmitter 1020 connected to either the same or different antenna 1035 for transmitting radio communications to access terminals. Connected to transmitter 1020 is a digital-to-analog (D/A) converter 1015. D/A converter 1015 converts the digital communications received from baseband component 1005 via digital IF processing unit 1010 into analog output for transmission to the mobile subscriber units. In some embodiments, a multiplexer 1084 for multiplexing of multiple-channel signals and multiplexing of a variety of signals including a voice signal and a data signal. A central processor 1080 is coupled to main unit 1050 and Radio Unit for controlling various processing which includes the processing of voice or data signal.

It is to be understood that the embodiments described herein may be implemented by hardware, software, firmware, middleware, microcode, or any combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments to enable a person skilled in the art to make or use the features, functions, operations, and embodiments disclosed herein. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for seamless inter-frequency handoff in a wireless network, comprising:
reporting to an access network a sector pilot strength information for a first frequency member in a message specified in an active set management protocol;
receiving pilot timing information for a second frequency member in a message specified in the active set management protocol, wherein the first frequency member is operating at a different frequency than the second frequency member;
generating a tune-away schedule for a first frequency member based on a frame boundary timing for the first frequency member and the pilot timing information for the second frequency member;
periodically tuning to the second frequency member based on the generated tune-away schedule to perform pilot strength measurements for the second frequency member;
if the measured pilot strength for the second frequency member exceeds a threshold, adding to the second frequency member to a same active set as the first frequency member and establishing a radio link with the access network for the second frequency member;
ascertaining whether to handoff from the first frequency member to the second frequency member, wherein both the first and the second frequency members are included in the same active set; and
seamlessly handing off to the second frequency member.

2. The method of claim 1, further comprising handing off to the second frequency member when a channel quality level of the first frequency member falls below another threshold.

3. The method of claim 1, wherein generating a tune-away schedule, further comprising determining a time to initiate a temporary tune-away to the frequency of the second frequency member.

4. The method of claim 3, the tune-away comprising discontinuing monitoring forward link channels associated with the access network.

5. The method of claim 3, the tune-away comprising discontinuing communications to the access network over a reverse link.

6. The method of claim 1, reporting a sector pilot strength information for the first frequency member, further comprising using a first receiver for communication and a second receiver to report the sector pilot strength.

7. The method of claim 1, wherein the message specified in the active set management protocol for reporting the sector pilot strength information is a PilotReport message.

8. The method of claim 1, wherein the message specified in the active set management protocol for receiving the second frequency member is an ActiveSetAssignment message.

9. The method of claim 1, wherein seamlessly handing off to the second frequency member is during an idle session.

10. The method of claim 1, wherein seamlessly handing off to the second frequency member is during an active session.

11. The method of claim 1, wherein the seamless inter-frequency handoff from the first frequency member to the second frequency member is performed if the radio link will not be interrupted.

12. The method of claim 1, wherein the seamless inter-frequency handoff from the first frequency member to the second frequency member is not performed if there will be an interruption in a radio link.

13. The method of claim 1, wherein the tune-away schedule includes a tune-away time parameter, a tune-away duration parameter, and a tune-away periodicity parameter.

14. The method of claim 1, wherein before tuning to the second frequency member to perform pilot strength measurements for the second frequency member, requesting a permission of the access network to tune away from the first frequency member.

15. An apparatus for seamless inter-frequency handoff in a wireless communication environment, comprising:
means for reporting to a radio access network pilot strength information for a first sector operation at a first frequency;
means for receiving pilot timing information for a second sector operating at a second frequency, wherein the first frequency is different from the second frequency;
means for generating a tune-away schedule for a first sector based on a frame boundary timing for the first sector and the pilot timing information for the second sector;
means for periodically tuning to the second sector based on the generated tune-away schedule to perform pilot strength measurements for the second sector;
means for establishing a radio link with the second sector if the measured pilot strength for the second sector exceeds a threshold;
means for adding the second sector to a same active set as the first sector;
means for ascertaining whether to handoff from the first sector to the second sector; and
means for seamlessly performing an inter-frequency handoff between the first and the second sectors included in the same active set.

16. The apparatus of claim 15, further comprising means for temporarily tuning-away to the second sector while in a connected mode with the first sector.

17. The apparatus of claim 15, further comprising means for receiving messages during a connected mode.

18. The apparatus of claim 15, wherein the means for reporting responds to a SectorParameters message specified in an overhead messages protocol.

19. The apparatus of claim 15, wherein the means for seamlessly performing an inter-frequency handoff receives an ActiveSetAssignment message specified in an active set management protocol.

20. The apparatus of claim 15, wherein the tune-away schedule includes a tune-away time parameter, a tune-away duration parameter, and a tune-away periodicity parameter.

21. The apparatus of claim 15, wherein means for periodically tuning to the second sector to perform pilot strength measurements comprise means for requesting a permission from the first sector to tune away from the first sector.

22. A method for seamless inter-frequency handoff, comprising the steps of:
generating a plurality of tune-away schedules for a plurality of different frequency members, wherein a tune-away schedule is based on a frame boundary timing for a first frequency member and pilot timing information for a second frequency member, where in the first and second frequency members operate at different frequencies;

receiving a request for a tune-away period from an access terminal operating at a first frequency member in accordance with associated tune-away schedule;

sending a permission message to the access terminal to tune-away;

receiving from an access terminal a sector pilot strength information for the first frequency member in a message specified in an active set management protocol;

sending information about a second frequency member in a message specified in the active set management protocol, wherein both the first and the second frequency members are included in a same active set; and allowing the access terminal to seamlessly hand off to the second frequency member.

23. The method, of claim 22, wherein the tune-away includes discontinuing communication to the access terminal over a forward link.

24. The method of claim 22, wherein the tune-away includes discontinuing monitoring a reverse link channel associated with the access terminal.

25. The method of claim 22, wherein the step of allowing the access terminal to seamlessly hand off to the second frequency member is during an idle session.

26. The method of claim 22, wherein the step of allowing the access terminal to seamlessly hand off to the second frequency member is during an active session.

27. The method of claim of claim 22, wherein the step of allowing the access terminal to seamlessly hand off to the second frequency member is performed if there will be an uninterrupted radio link.

28. The method of claim 22, wherein the step of allowing the access terminal to seamlessly hand off to the second frequency member is not performed if there will be an interruption in a radio link.

29. The method of claim 22, wherein the tune-away schedule includes a tune-away time parameter, a tune-away duration parameter, and a tune-away periodicity parameter.

30. An access network that provides for seamless inter-frequency handoff in a wireless communication system, comprising:

a receiver that receives a tune-away request from a mobile device in accordance with a tune-away schedules generated by the mobile device based on a frame boundary timing for a first frequency member and pilot timing information for a second frequency member, wherein the first and second frequency members operate at different frequencies;

a processor that determines whether the mobile device may tune away from the first frequency member to the second frequency member based in part on the tune-away schedule; and a transmitter that sends an ActiveSetAssignment message that notifies the mobile device that the first and second frequency members are to be included in a same active set of the mobile device, whereby the mobile device can seamlessly hand off from the first frequency member to the second frequency member.

31. The access network of claim 30, wherein the transmitter further requests at least a second access network to respond with resources that are available for the mobile device.

32. The access network of claim 30, wherein the receiver further receives resource information from at least a second access network.

33. The access network of claim 30, wherein the tune-away schedule includes a tune-away time parameter, a tune-away duration parameter, and a tune-away periodicity parameter.

* * * * *